Dec. 8, 1953  A. S. RITTER  2,661,574
POTTED PLANT PACKAGE
Filed Nov. 28, 1950
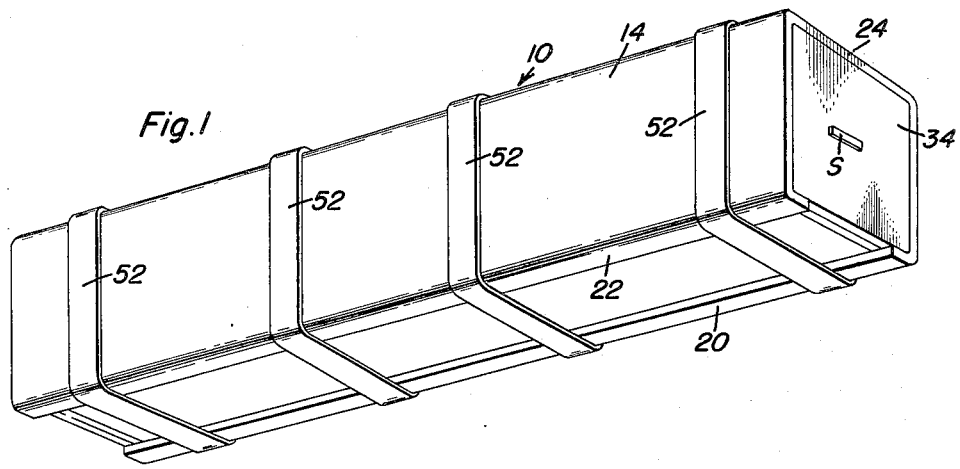
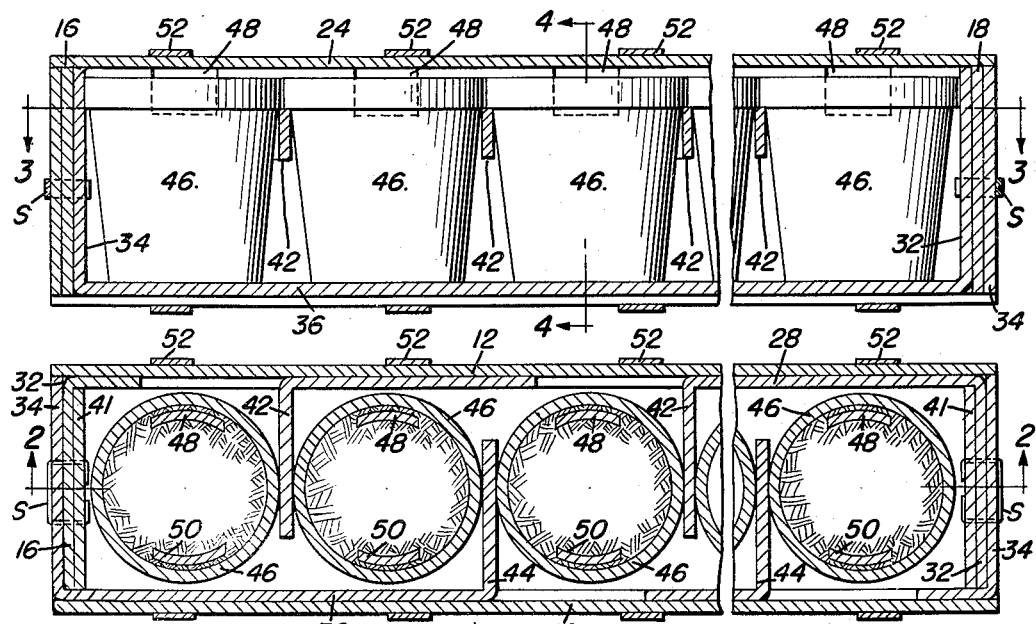
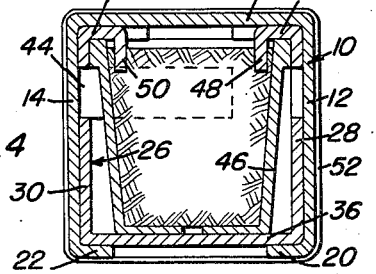
Alexander S. Ritter
INVENTOR.

Patented Dec. 8, 1953

2,661,574

UNITED STATES PATENT OFFICE 2,661,574

POTTED PLANT PACKAGE

Alexander S. Ritter, Brielle, N. J.

Application November 28, 1950, Serial No. 197,925

1 Claim. (Cl. 47—37)

This invention relates to new and useful improvements in containers and the primary object of the present invention is to provide a container whereby small potted plants may be transported or shipped without loss of soil in the plant pots or damage to the plant.

Another important object of the present invention is to provide a plant tray composed of inner and outer containers and holding tabs struck from the inner container for positioning in plant pots and tongues also struck from the inner container for spacing adjacent pots from each other.

A further object of the present invention is to provide a plant tray including inner and outer containers that are held assembled by a group of resilient bands which are quickly and readily removed for access to plants in the inner container.

A still further aim of the present invention is to provide a plant tray of the aforementioned character that is simple and practical in construction, strong and reliable in use, neat and attractive in appearance, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention assembled for use;

Figure 2 is a longitudinal vertical sectional view taken substantially on the plane of section line 2—2 of Figure 3;

Figure 3 is a longitudinal horizontal sectional view taken substantially on the plane of section line 3—3 of Figure 2; and Figure 4 is a transverse vertical sectional view taken substantially on the plane of section line 4—4 of Figure 2.

Referring now to the drawings in detail, wherein for the purpose of illustration, there is disclosed a preferred embodiment of the present invention, the numeral 10 represents an outer elongated container of preferably cardboard material which is folded to form a pair of longitudinal side walls 12 and 14. The lower ends of the side walls 12 and 14 are turned inwardly to form flanges 20 and 22. The outer container 10 also includes an upper wall 24 that joins the side walls 12 and 14.

An inner elongated container 26, also constructed of cardboard or such suitable material, is positioned within the outer container and is bent or folded to include a pair of side walls 28 and 30. The ends of the wall 28 are folded inwardly to provide end walls 32 and the ends of the wall 30 are folded in to form end walls 34. The inner container 26 also includes a bottom wall 36 and the upper ends of the side walls 28 and 30 are turned inwardly to provide flanges 38 and 40 that underlie the upper wall 24 of the outer container 10. The ends of the bottom wall 36 are folded upwardly to form end walls 41 that are secured to the end walls 32 and 34 by staples S.

Longitudinally spaced tongues 42 and 44 are struck outwardly from the side walls 28 and 30 of the inner container and are positioned within the outer container. The tongues 42 and 44 are staggered relative to each other and are positioned between adjacent plant pots 46.

Registering pairs of holding tabs 48 and 50 are struck downwardly from the flanges 38 and 40, and are arranged in laterally spaced pairs. The tabs of each pair are arcuate in lateral cross section with their concaved faces in opposed relation. Further, each pair of tabs are disposed intermediate the adjacent tongues 42 and 44 with the lower end portions of the tabs 48 and 50 being disposed in the soil in the pots 46 to retain the soil in the pots and to also prevent shifting of the pots in the inner container.

Resilient bands 52 embrace the outer container and retain the inner container within the outer container. These bands and the outer container are removed to permit access to plants in the inner container.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A plant package comprising inner and outer containers enclosing a plurality of potted plants, said inner container being channel-shaped in cross-section and including a bottom wall, side walls integrally connected to said bottom wall along side edges thereof, said side walls having upper edges, integral flanges carried by said side walls at said upper edges in coplanar inwardly extending opposed relation, longitudinally spaced tongues struck from said side walls and extending laterally into said inner container and spacing adjacent pots in said inner container from each other, the tongues of one side wall being alternated with the tongues of the other side wall, and longitudinally spaced tabs struck downwardly from said flanges and entering pots in said inner container and being embedded in soil carried therein, the tabs of one flange being disposed opposite the tabs of the other flange whereby said tabs are arranged in laterally spaced pairs, the tabs of each pair being arcuate in lateral cross-section to conform to the arcuate shape of the pot and with their concaved faces in opposed relation, each pair of tabs being disposed intermediate an adjacent pair of tongues, said outer container being received over said inner container and closing the space between said upper edges of said side walls.

ALEXANDER S. RITTER.

References Cited in the file of this patent

UNITED STATES PATENTS

| Number | Name | Date |
|---|---|---|
| 1,599,026 | Markert | Sept. 7, 1926 |
| 1,687,052 | Barber | Oct. 9, 1928 |
| 1,735,876 | Patterson | Nov. 19, 1929 |
| 1,889,933 | Pratt | Dec. 6, 1932 |
| 1,911,215 | Walter | May 30, 1933 |
| 2,117,516 | Skidelsky | May 17, 1938 |
| 2,163,045 | Lavere | June 20, 1939 |
| 2,176,452 | Choffel | Oct. 17, 1939 |
| 2,204,118 | Brogden | June 11, 1940 |
| 2,313,376 | Ullman | Mar. 9, 1943 |
| 2,567,706 | Hannum et al. | Sept. 11, 1951 |
| 2,597,377 | Robinson | May 20, 1952 |